R. J. HODGE.
NAUTICAL INSTRUMENT.
APPLICATION FILED JUNE 17, 1908.

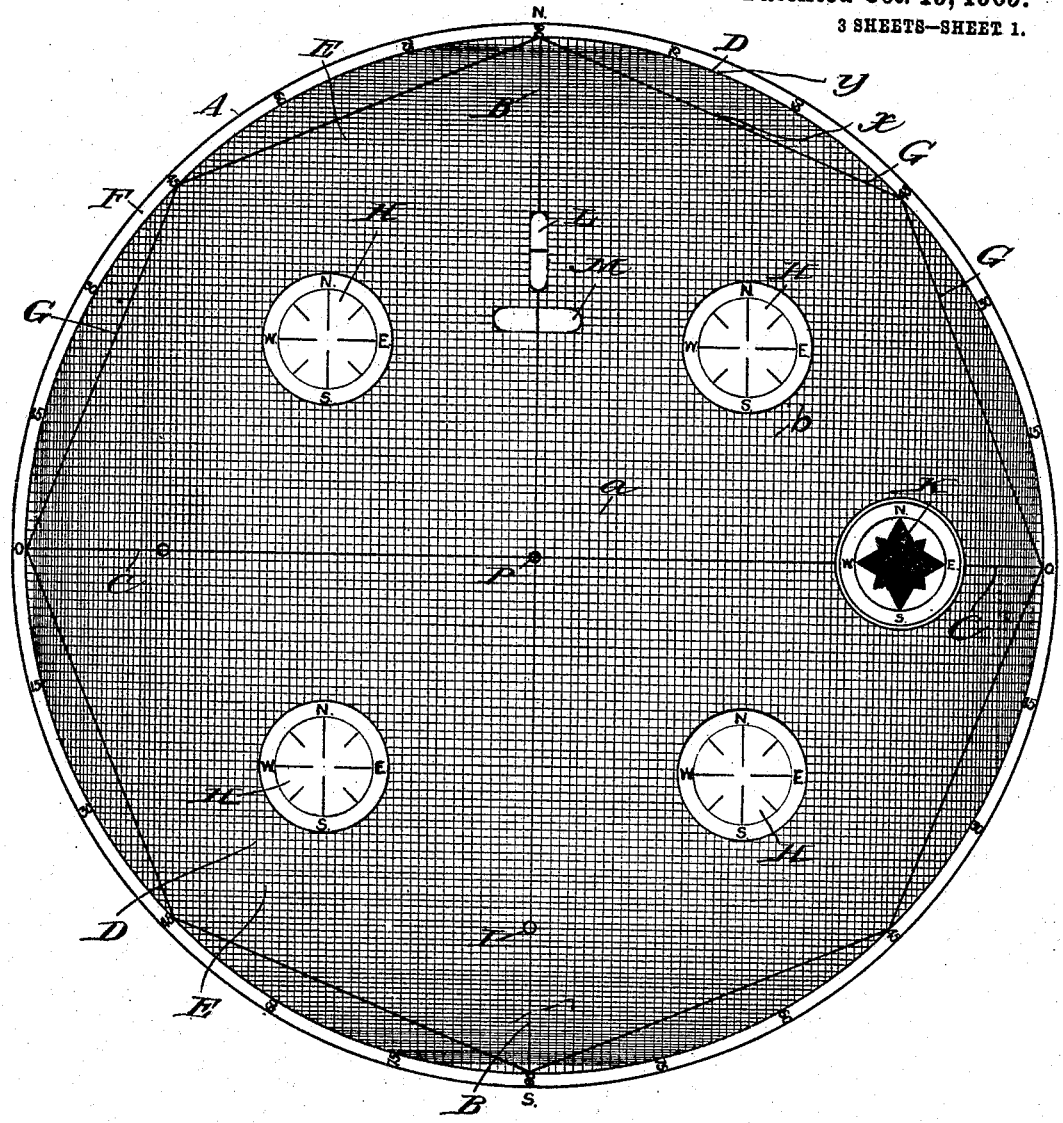

937,441.

Patented Oct. 19, 1909.
3 SHEETS—SHEET 2.

Witnesses
Inventor

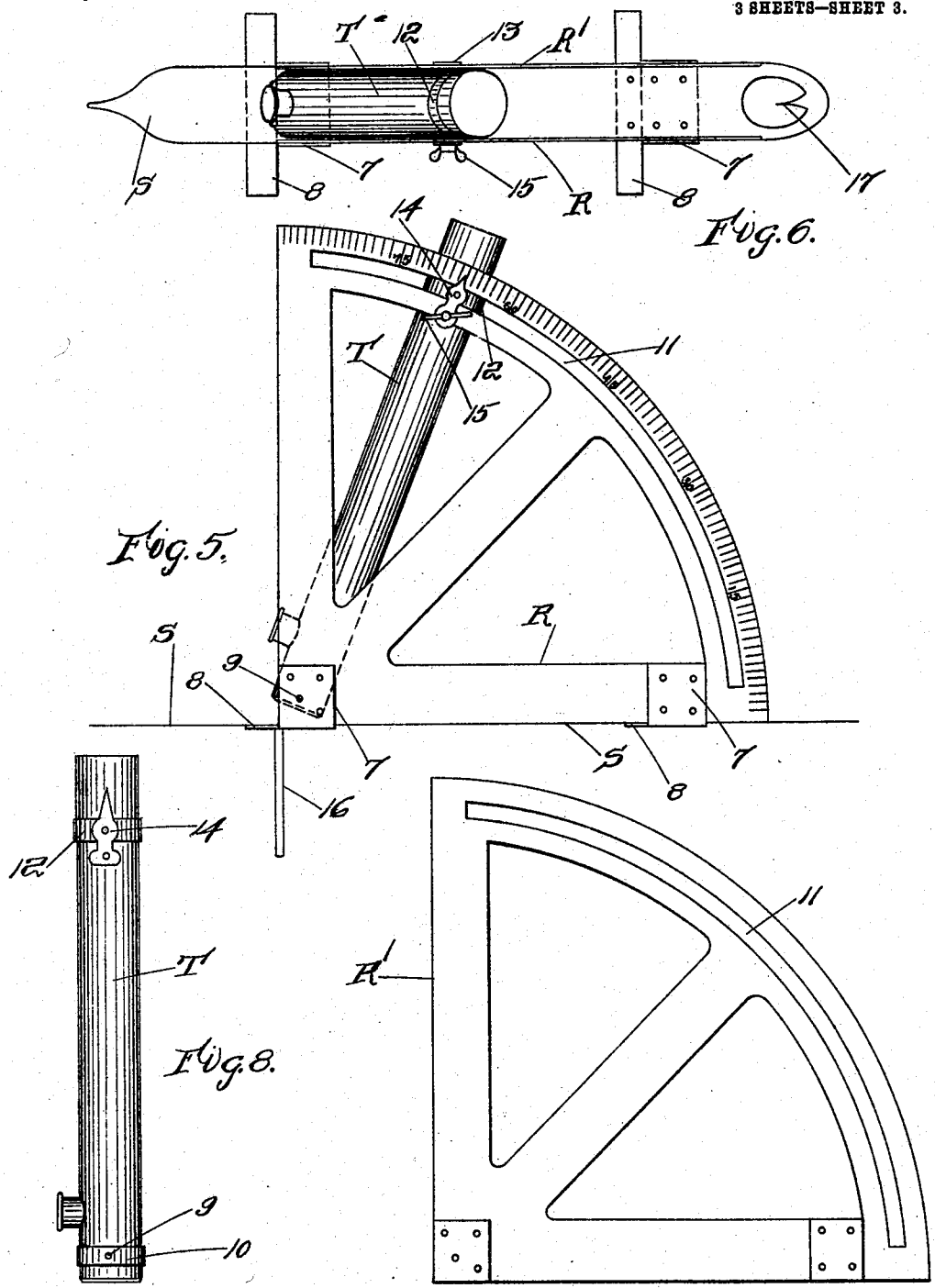

UNITED STATES PATENT OFFICE.

ROBERT J. HODGE, OF FRANKLIN PARK, MASSACHUSETTS.

NAUTICAL INSTRUMENT.

937,441.     Specification of Letters Patent.     Patented Oct. 19, 1909.

Application filed June 17, 1908. Serial No. 438,972.

*To all whom it may concern:*

Be it known that I, ROBERT J. HODGE, a citizen of the United States, residing at Franklin Park, in the city of Boston, county of Suffolk, and State of Massachusetts, have invented a certain new and useful Improvement in Nautical Instruments, of which the following is a specification, reference being had therein to the accompanying drawings.

This invention relates to apparatus for obtaining latitude and longitude and for determining the course and distances between two points.

The invention will be fully understood from the following description taken in connection with the accompanying drawings, and the novel features are pointed out and clearly defined in the claims at the close of the specification.

Figure 3:
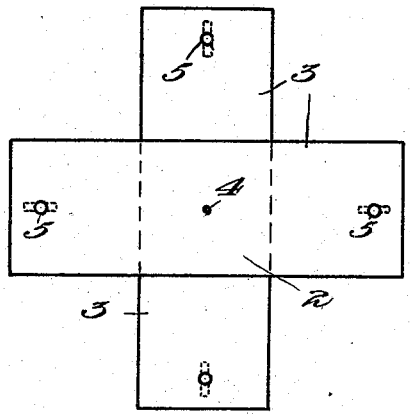
Figure 4:
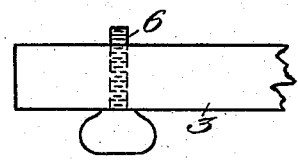
Figure 2:
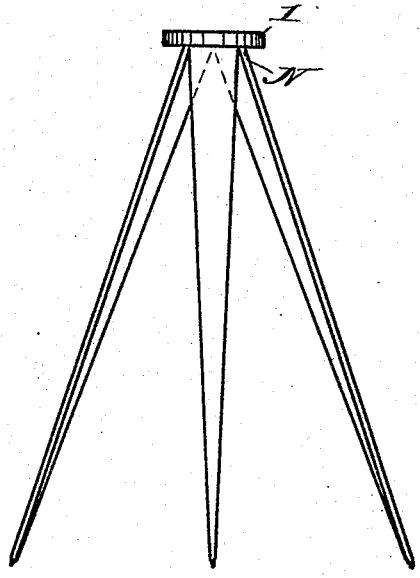

In the drawings,—Figure 1 is a plan of the disk portion of the apparatus embodying the invention. Fig. 2 is a side elevation of the tripod for supporting the apparatus. Fig. 3 is a detail plan of the plate which is to be mounted on the tripod to support the disk. Fig. 4 is a side elevation broken away of the supporting plate shown in Fig. 3 and one of the adjusting screws. Fig. 5 is a side elevation of the quadrant arcs and base and telescope connected therewith. Fig. 6 is a plan view of Fig. 5. Fig. 7 is a side elevation of the quadrant arc on the opposite side from that shown in Fig. 5. Fig. 8 is a detail view of the telescope and rings.

Referring to the drawings,—A circular disk A of metal representing the circumference of the earth is marked on its surface with two lines passing through the center at right angles with each other, as shown in Fig. 1, the vertical line B—B representing the polar center and the horizontal line C—C representing the equator. A series of lines D—D parallel with the line B—B on each side thereof represent meridians of longitude one degree apart. Parallel with the equatorial line C—C are a series of lines E—E representing parallels of latitude one degree apart. The parallels of latitude on each side of the equatorial line and the meridians of longitude on each side of the polar center are made light as compared with the polar center and equatorial line for the purpose of distinction. A plain, annular margin F is left at the outer edge of the disk on which numerals are placed to mark the degrees on the circumference. The upper and lower ends of the polar center B—B are marked respectively N and S indicating the north and south poles.

A series of eight chords G are drawn, one for each arc of 45 degrees. These chords are for convenience of reference made heavier than the latitude and longitude lines. Preferably all of the lines on the disk are formed by cutting in the surface of the metal disk. In each quadrant of the disk there is drawn a circular figure designated H representing a compass having radial lines indicating the points of the compass, the north and south lines being parallel with the meridian lines and the east and west lines being parallel with the equatorial line. The purpose of these compasses is to determine the course between any two given points whose latitude and longitude are known.

Set into the disk below the surface are two spirit levels L and M respectively, one on the polar center and the other at right angles thereto and crosswise thereof, the disk being open above the levels or else transparent so that the spirit levels can be read from the upper surface, said spirit levels being for the purpose of determining when the disk is on a perfect level.

At one or more points in the equatorial line, preferably one on each side of the polar center, and at one or more points in the polar center line, there is formed a pivot hole I which is adapted to receive the spindle of a movable magnetic compass K. In Fig. 1 the compass is shown as mounted in one of the said holes.

A suitable stand is provided on which the disk may be rotatably mounted, said stand being also adjustable to permit the disk to be adjusted to an exactly level position. The means which I have provided consists of a tripod N whose legs are hinged to the head 1 in usual manner of tripods. Adapted to be secured to the top of the head 1 of the tripod is a plate 2 in form of a cross having four projecting arms 3, the said plate 2 having a hole 4 in the center thereof, said disk A being formed with a central aperture P adapted to register with the hole 4 and through both of which holes the pin 16 of the quadrant arc passes down into the head of the tripod. Each of the arms 3 of said plate 2 is formed with a screw hole 5 through which a screw pin 6 extends upward from beneath, said four screw pins 6 serving as additional means to level the disk after the tripod is set.

R, R′, are two quadrant arcs, preferably of thin metal, standing parallel with each other a short distance apart on their radial edges and mounted on a metallic base S. This base S is a narrow strip of thin metal and the manner of attaching the said arcs to said base which I have shown consists of angle plates 7 whose bases are secured to the base S and whose upright portions are secured to the sides of the quadrant arcs R, R′, by riveting or by any other suitable means. In order to steady the quadrant arcs in their upright positions I provide two cross-bar supports or wings 8, 8, secured to the base S on the under side thereof.

Mounted between the two quadrant arcs is a telescope T pivotally connected with the quadrant arcs near their center and arranged to point radially outward between the two quadrant arcs and to be adjusted to point at any angle of elevation desired. The means for mounting and adjusting said telescope which I have provided are as follows: Pivoted between the two quadrant arcs near their center on pivot 9 is a ring 10, said pivots thus serving as trunnions for the ring. This ring 10 is adapted to receive the lower end of the telescope. The arc portions of the quadrants are each formed with a slot 11 extending for nearly the entire length thereof. A ring 12, through which the outer end of the telescope is adapted to pass, is mounted between the arc portions of the two quadrants, one edge of the ring being secured to a head 13 which bears against one of the arcs and the opposite edge of the ring being secured to a pointer 14 which extends crosswise of the slot 11 on the outer side of the quadrant and which is provided with a thumb-screw 15 whereby when the telescope is mounted within the rings and is set at any particular angle, the thumbscrew 15 may be set up to clamp the telescope in its adjusted position. The arc R is marked with degrees. The pointer 14 will indicate upon the quadrant arc R the angle of elevation to which the telescope is pointed.

Projecting vertically downward from the base S at the center of the quadrant and midway between the two arcs is a pin 16 which is adapted to fit in the hole P in the center of the disk A, said pin being rotatable within said hole so that when the quadrants and their bases are placed upon the disk the quadrants may be turned on the disk so that the quadrants and the telescope may be swung around the center. The center of the lens should be marked by the intersection of two fine diametric lines crossing each other at right angles.

In the use of the apparatus the disk A is mounted upon the plate 2 which has been previously mounted upon the tripod, and the tripod is adjusted to bring the disk to a level as shown by the spirit levels. The disk A is then turned on its pivot in the horizontal plane until the north pole of the disk points exactly to the magnetic north pole as can be determined by the magnetic compass K. Then the quadrant arcs and their supporting base are turned on their pivot and the telescope T is adjusted to the proper angle of the elevation until by sighting through the telescope the central point of the lens is exactly in line with the center of the sun. By means of the indicator 14 the degree of elevation of the telescope can then be read off and as the disk is on an exact level, the angle of elevation of the telescope will indicate the altitude of the sun above the horizon. The outer end of the supporting base S for the quadrant is formed with a pointer 17 which will indicate upon the graduated rim F of the disk the degree north or south from the equator at which the quadrant is set.

By noting the angle of elevation of the sun and also the time of day and the day of the year on which the observation is made, I am enabled by means of a certain system of mathematical computations with which I am familiar to determine from a single observation the exact latitude and longitude of the point where the observation is made.

I am also able by the use of the disk to determine the exact distance between any two points whose latitude and longitude are known. My method of determining the distance between two points is as follows: Assuming, for instance, that one of the points $a$ is located in the upper right hand quadrant of the disk on the 81st degree meridian and on the 8th degree parallel—that is, at the intersection of those two lines. Suppose the other point $b$ is located in the same quadrant on the intersection of the 58th degree meridian and the 15th degree parallel. I lay off the distance on the flat surface of the disk between the two points $a$ and $b$ by means of dividers, or measure it in any other way, and then lay off the same flat distance on the equatorial line from the center of the disk and count the number of degrees thus laid off. In the case illustrated, if we measure the flat distance between the points $a$ and $b$ on the disk and then lay it off on the equatorial line as described, we find that it measures 24 degrees. Then I find the difference in longitude between the two points $a$ and $b$ and also the difference in latitude. If the difference in longitude is greater than the difference in latitude—(and that is the fact in the present illustration)—then I find the meridian which is midway between the meridians of the two points $a$ and $b$. In this case $a$ is on the 81st degree meridian and b is on the 58th degree meridian and the meridian midway between them is 69½. This can be determined either by counting the meridian lines between the points a and b and finding the middle one and then following it out to the end, or we can follow out to the end the two meridian lines on which a and b respectively are located and count to half-way between them at the end. I then measure or lay off by dividers the flat distance on the disk between the point x where the 69½ degree meridian intersects the chord and the end of the meridian where it intersects the circular boundary line at y. I lay off that distance on the equatorial line, measured from the center, and count the degrees measured thereby. In the case illustrated the distance between the intersection of the 69½ meridian with the chord and the intersection of the meridian with the circle we find to be 5 degrees when laid out on the equator and one-third thereof is 1⅔ degrees. 1⅔ degrees is the allowance to be made for the curvature. Adding this 1⅔ degrees to the 24 degrees previously laid off makes 25⅔ degrees which is the exact distance in degrees between the points a and b. Counting 60 miles to a degree, the distance in miles between points a and b is 1540. If the difference in latitude were greater than the difference in longitude between the points a and b or between the points whose distance apart is being measured, I should take the middle parallel of latitude between the two points instead of the middle meridian and follow the middle parallel to the circumference and then lay off the flat distance between the intersection of the parallel with the chord and its intersection with the circle. I then lay off this distance on the equator as before described and take one-third of the number of degrees there measured and add it to the flat number of degrees, 24 for instance, previously found between the two points being measured: that is,—if the difference in longitude between the two points, when the distance apart is being measured, is greater than the difference in latitude, I follow the meridian in order to get the allowance for curvature, and if the difference in latitude is greater than the difference in longitude, I follow the parallel of latitude to get the difference in curvature.

What I claim is:

1. In a device for determining the distance between two points whose latitude and longitude are known, a circular disk having marked thereon a diametrical line representing the polar center and a series of lines parallel therewith and on each side thereof representing meridians, a second diametrical line at right angles with the said polar center line and representing the equator and a series of lines parallel therewith on each side thereof representing the parallels of latitude, the arc of each quadrant being marked to indicate the degrees of the several meridians and parallels of latitude, each quadrant having its arc divided into two equal parts of 45 degrees each, and a chord subtending each arc of 45 degrees.

2. A device for determining the latitude and longitude of any particular point comprising a circular disk having marked thereon a diametrical line representing the polar center and a series of lines parallel therewith and on each side thereof representing meridians, a second diametrical line at right angles with the said polar center line and representing the equator and a series of lines parallel therewith on each side thereof representing the parallels of latitude, each quadrant having its arc divided into two equal parts of 45 degrees each, a chord subtending each arc of 45 degrees, a mount for said disk, means for adjusting said disk to a perfect level, a movable magnetic compass and a bearing on said disk in which said compass may be journaled, whereby the disk may be adjusted so that the meridians lie in magnetic north and south lines, a quadrant arc whose radius is equal to the radius of the said disk, means for pivotally mounting said quadrant at its center in the center of the disk and supporting said quadrant on one of its radial edges while so journaled so that said quadrant will stand in a vertical plane while the disk is in a horizontal plane, the arc of said quadrant being graduated to degrees, a telescope pivotally connected with said quadrant and extending radially therewith, means for adjusting said telescope to any angle of elevation and clamping it at the angle to which it is adjusted, said quadrant being movable on its center whereby it may be turned on its axis through the entire circumference of the disk, said telescope being adjustable to point to any angle of elevation from the horizontal to the vertical.

3. In a device for determining the latitude and longitude of any point, a circular disk having its circumference marked with a scale of degrees, a quadrant arc having a telescope mounted thereon and pointing radially outward from the center of said arc and pivotally connected therewith, means for clamping said telescope to point to any angle of elevation on said arc, and means for pivotally connecting said arc at its center with the center of said disk while said quadrant stands on one of its radial edges on said disk.

4. In a device for determining the latitude and longitude of any point, a circular disk having its circumference marked with a scale of degrees, two quadrant arcs mounted parallel with each other on a base which is secured to radial edges of said quadrants, a telescope mounted between said quadrant arcs and pivotally connected therewith and extending radially outward therefrom, said pivot being in a radial line, means for clamping said telescope at any adjusted angle of elevation, means for pivotally mounting said combined quadrants and telescope centrally with said disk whereby said quadrants and telescope may be turned on said disk around the axis of the disk.

5. In a device for determining the latitude and longitude of any point, a circular disk having its circumference marked with a scale of degrees, a quadrant arc having a telescope mounted thereon and pointing radially outward from the center of said arc and pivotally connected therewith, means for clamping said telescope to point to any angle of elevation on said arc, means for pivotally connecting said arc at its center with the center of said disk while said quadrant stands on one of its radial edges on said disk, said disk having marked thereon two diametrical lines at right angles with each other representing respectively the polar center and the equator, a series of lines parallel with said polar center line representing meridians and a series of lines parallel with said equatorial line representing parallels of latitude, a circular boundary of said meridians and parallels graduated to degrees, a movable magnetic compass and a bearing on said disk on which said compass may be journaled, a mount on which said disk is centrally pivoted whereby said disk may be rotated on its center to bring the meridian lines parallel with the magnetic north and south line, each quadrant of the disk having its arc divided into two equal parts of 45 degrees each, a chord subtending each arc of 45 degrees, each quadrant of the disk having marked thereon fixed lines representing the points of the compass, the north and south lines thereof being parallel with the meridian lines and the east and west lines thereof being parallel with the parallels of latitude.

6. In a device for determining the latitude and longitude of any point, a circular disk having its circumference marked with a scale of degrees, a quadrant arc having a telescope mounted thereon and pointing radially outward from the center of said arc and pivotally connected therewith, means for clamping said telescope to point to any angle of elevation on said arc, means for pivotally connecting said arc at its center with the center of said disk while said quadrant stands on one of its radial edges on said disk, and means for adjusting said disk on its mount whereby said disk may be adjusted to a horizontal plane.

7. In a device for determining the latitude and longitude of any point, a circular disk having its circumference marked with a scale of degrees, a quadrant arc having a telescope mounted thereon and pointing radially outward from the center of said arc and pivotally connected therewith, means for clamping said telescope to point to any angle of elevation on said arc, means for pivotally connecting said arc at its center with the center of said disk while said quadrant stands on one of its radial edges on said disk, a tripod comprising a head having its legs pivotally connected therewith, a movable plate pivotally mounted on said base and adapted to support said disk and a series of adjustable screws extending up through said plate, whereby said disk may be finely adjusted to a horizontal position independently of the adjustment of the tripod.

In testimony whereof I affix my signature in presence of two witnesses.

ROBERT J. HODGE.

Witnesses:
WILLIAM O. CHILDS,
ALICE MURPHY.